United States Patent
Flanigan et al.

(10) Patent No.: US 8,605,852 B2
(45) Date of Patent: Dec. 10, 2013

(54) WEDGE POSITIONING APPARATUS FOR JET PUMP ASSEMBLIES IN NUCLEAR REACTORS

(75) Inventors: Michael A. Flanigan, Dutch Flat, CA (US); Stephen J. Kaylor, San Jose, CA (US); James M. DuBay, Louisville, CO (US); Rodney Lum, Dublin, CA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 538 days.

(21) Appl. No.: 12/916,660

(22) Filed: Nov. 1, 2010

(65) Prior Publication Data

US 2011/0280360 A1    Nov. 17, 2011

Related U.S. Application Data

(60) Provisional application No. 61/259,291, filed on Nov. 9, 2009.

(51) Int. Cl.
*G21C 15/00*    (2006.01)
*G21C 19/28*    (2006.01)

(52) U.S. Cl.
USPC ........................................... 376/372

(58) Field of Classification Search
USPC ........................................... 376/372
See application file for complete search history.

(56) References Cited

U.S. PATENT DOCUMENTS

| | | |
|---|---|---|
| 4,675,149 A | 6/1987 | Perry et al. |
| 6,052,425 A | 4/2000 | Erbes et al. |
| 6,320,923 B2 | 11/2001 | Wivagg et al. |
| 6,490,331 B2 | 12/2002 | Erbes |
| 6,788,756 B2 | 9/2004 | Erbes |
| 7,023,949 B2 | 4/2006 | Wivagg |
| 7,627,074 B2 | 12/2009 | Erbes et al. |
| 2008/0137793 A1 | 6/2008 | Erbes et al. |

FOREIGN PATENT DOCUMENTS

WO    WO 00/62303 A1    10/2000

*Primary Examiner* — Jack W Keith
*Assistant Examiner* — Frank J McGue
(74) *Attorney, Agent, or Firm* — Richard J. Coldren; Westinghouse Electric Company LLC (57) ABSTRACT

An auxiliary wedge positioning apparatus/assembly 100 for use in a nuclear reactor pressure vessel 12 having riser piping 44 and 144 and a jet pump assembly 46 and 120, the apparatus 100 having a combination slide wedge 105 and spring 103 mounted on a restraint bracket body 102 having a transverse rail 110 with end gull-wing hooked protrusions 111 with sections 150, 152, 156 and wing stability attachment 155, the slide wedge used for placement between the riser piping 44 and 144 and jet pump assembly 46 and 120 to control vibrations during operation of the reactor vessel 12.

10 Claims, 7 Drawing Sheets

WEDGE POSITIONING APPARATUS FOR JET PUMP ASSEMBLIES IN NUCLEAR REACTORS

CROSS REFERENCE TO RELATED APPLICATION

This application claims the benefit of U.S. Provisional Application Ser. No. 61/259,291, filed on Nov. 9, 2009.

BACKGROUND OF THE INVENTION

1. Field of the Invention

This invention relates generally to jet pump stabilization in nuclear reactors and, more particularly, to an auxiliary wedge apparatus, for modifying jet pump wedge positioning assemblies within a nuclear reactor pressure vessel.

2. Description of Related Art

As detailed by Wivagg in U.S. Pat. No. 7,023,949 ("Wivagg '949"). Boiling water reactors ("BWRs") are designed to generate steam in reactor pressure vessels ("RPVs") by heating the water surrounding uranium-containing tubes of fuel assemblies located in the RPV core regions. The RPVs have recirculation loops designed to facilitate the circulation of water in the core regions. The recirculation loops pump water out of the RPVs and return the water to the inlets of jet pump assemblies located in annular regions in the RPVs surrounding the core regions. The jet pump assemblies are designed to entrain the surrounding water in the annular regions and then discharge the water in a manner that induces a desired flow pattern in the core regions. The jet pump assemblies are subject to vibrations caused by hydraulic forces due to the flow of water. Thus, in one BWR design, the jet pump assemblies are horizontally supported against vibration within brackets by a suspension system including a wedge movably mounted on a vertically oriented guide rod that is attached to a jet pump assembly. The wedge, which may weigh about seven pounds, is designed to slide downwardly under the force of gravity into the space between the bracket and the jet pump assembly and thereby urge the jet pump against adjustment screws.

Figure 1:
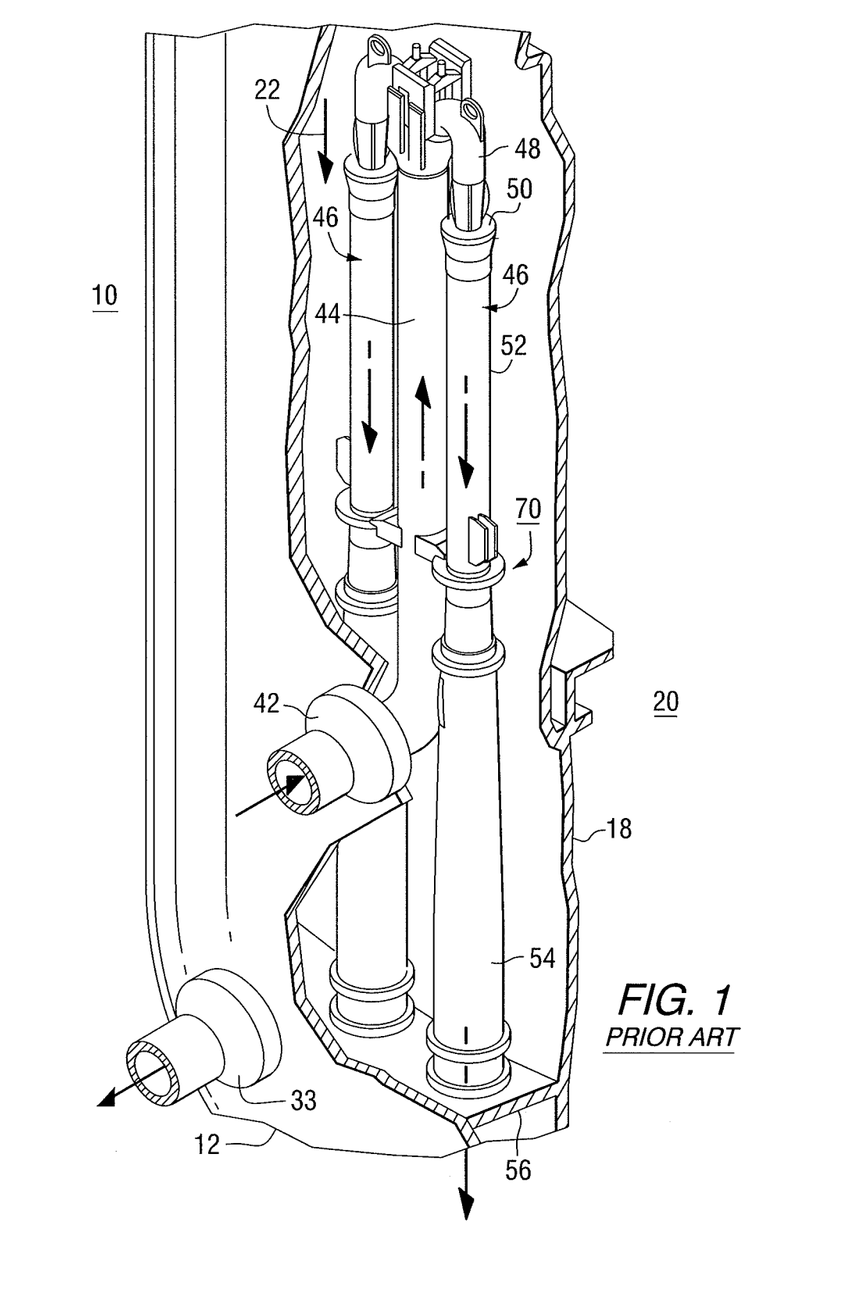
FIG. 1 is a prior art perspective schematic representation of a reactor pressure vessel which has been cut away to show a jet pump assembly arrangement.
Figure 2:
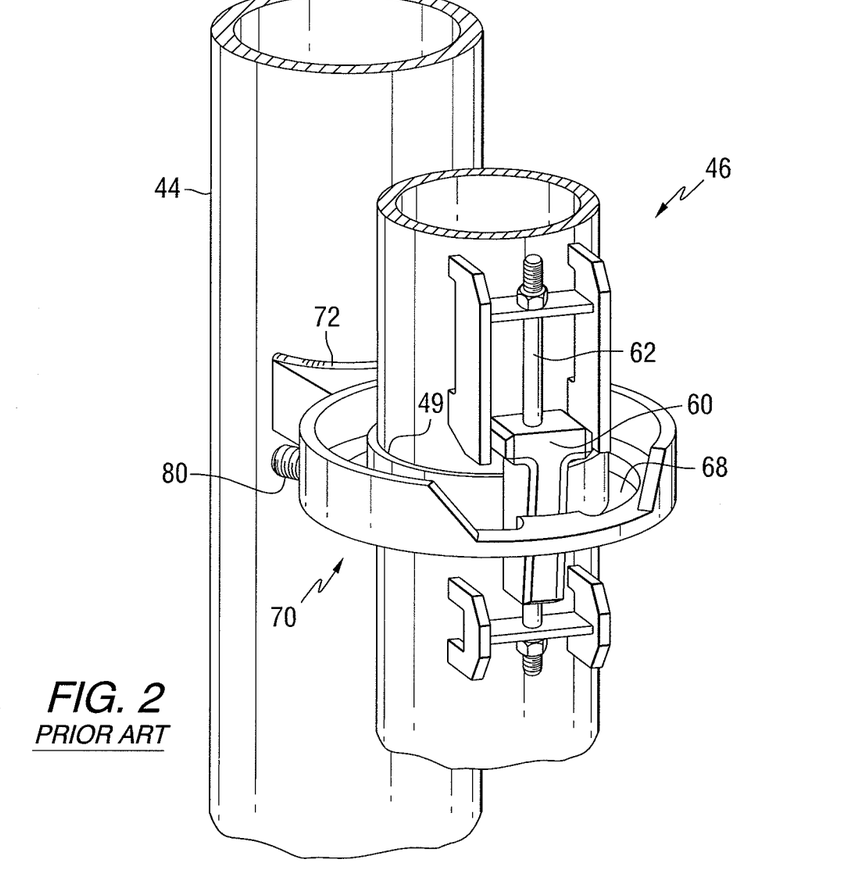
FIG. 2 is a prior art partial perspective elevation view of a jet pump assembly horizontally supported by a bracket, the bracket adjustment containing set screws.
Figure 3:
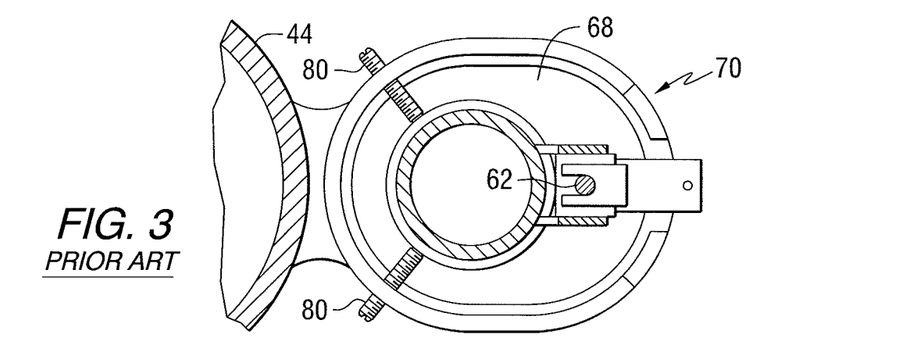
FIG. 3 is a prior art plan view of a jet pump assembly showing the position of the main wedge and two set/adjustment screws having no associated auxiliary wedge assembly.

This design is shown in prior art FIGS. 1-3 (from Wivagg '949), wherein, in FIG. 1, nuclear reactor 10 contains outside reactor pressure vessel 12, interior core shroud 18, surrounding reactor core assemblies 20, including fuel, usually $UO_2$ contained in zirconium based tubes, not shown. The core assemblies generate steam from cooling water. Inlet feed water 22 passes into recirculation water outlet nozzle 33 and is pumped to water inlet nozzle 42 via pumping loop (not shown) and passes to riser piping 44.

Riser piping 44 terminates at a manifold 48, sometimes referred to as a "ramshead." Each jet pump assembly 46 of the pair generally includes an inlet 50 adjacent the manifold 48 that is open to an annular region defined by the wall of the RPV pressure vessel 12 and wall of the core shroud 18 for entraining the surrounding water in the annular region, a mixing section 52 and a diffuser section 54 supported on a crossplate 56. The jet pump assembly 46 may have a boss 49 on its periphery surface as shown in FIG. 2. In the prior art, each jet pump assembly 46 had an associated main wedge 60 that was movably mounted on a vertically extending guide rod 62 fastened to the jet pump assembly 46. As shown in prior art FIG. 2, the main wedge 60 was designed to slide vertically through an opening 68, better shown in FIG. 3, in a restrainer bracket 70, having adjustment set screws 80, therethrough to contact the jet pump assembly 46. The bracket 70 was attached to the riser pump piping 44 by welds 72 or other suitable means. As shown, there are no wedges near the adjustment set screws 80 of FIGS. 2 and 3. The weight of the main wedge 60 provides a sufficient force urging the jet pump assembly 46 against two (or more) adjustment set screws 80 for horizontally supporting the jet pump assembly 46 against hydraulic forces and vibrations. The outer surface of the main wedge 60 could be inclined relative to the edge surface of the bracket 70.

Erbes et al. (U.S. Pat. No. 6,052,425) in their FIG. 2 show a plurality of set screws 32A to D passing through restrainer brackets 28A and B. The main wedges are shown as 30A and B disposed away from the set screws. This provides only two restraining wedge assemblies on opposite sides of inlet mixers assemblies 16A and B. U.S. Pat. No. 7,627,074 (Erbes et al.) teaches dual spring wedges contained within a U-shaped bracket where dual guide rods pass through the top of the U-shaped bracket, through the springs to contact dual wedges. Problems associated with this design are complexity and probable cost. Other patents dealing with jet pump wedges include U.S. Pat. Nos. 4,675,149; 6,320,923; 6,490,331; and 6,788,756 (Perry et al.; Wivagg et al.; Erbes; and Erbes, respectively). Existing designs usually require that the space between the mixer belly band and the restrainer bracket that is being occupied, needs to be measured and therefore the wedge assembly needs to be machined to fit each specific location.

What is needed is a simplified wedge design that does not need to be machined at site and does not require the removal of jet pumps for installation greatly reduces the cost of implementing the repair and is a significant advantage to the owner. What is also needed is an auxiliary wedge assembly disposed next to, over, or in some connection with the set screws and secondary bracing means.

It is therefore an object of this invention to provide a design that installs from above without removing jet pump hardware and provides a mechanism to accommodate a large range in manufacturing variation in jet pump positioning.

SUMMARY OF THE INVENTION

The above problems and needs are provided and objects met by providing an auxiliary wedge positioning apparatus for use in a nuclear reactor consisting essentially of:
(a) a restraint bracket body having a top end flat portion having one hole therethrough and a transverse rail with two bottom integral hooked protrusions each exactly opposite to each other and attached to the transverse rail, said protrusions having an angled gull wing shape with an upward member section and a downward member section;
(b) a single triangular slide wedge having a flat side attached to the transverse rail of the restraint bracket body, with an end flat portion and an angled side facing outward;
(c) a single slide rod passing through the top flat portion hole to contact the end flat portion of the triangular slide wedge; and
(d) a single spring disposed around the slide rod, the spring contacting the top end flat portion and exerting pressure against the end flat portion of the triangular slide wedge to exert pressure against adjacent bodies in the nuclear reactor.

Here, the hooked protrusions have a middle upward member section and an end downward section next to the transverse rail, and a wing stabilizing attachment parallel to the upward member section and the downward member section.

The invention also provides at least two separate auxiliary wedge positioning apparatus in a nuclear reactor, containing riser piping that can feed pumped cooled water to at least one jet pump assembly having a circumferential restrainer bracket, which restrainer bracket has at least two vibration damping adjustment set screws each set in a set screw block contacting the jet pump assembly, the bracket is positioned around the jet pump assembly which bracket also contacts the riser piping, such assembly and riser piping subject to vibration during reactor operation, wherein a main wedge is utilized away from the set screws while the at least two separate auxiliary wedge positioning apparatus being positioned adjacent the set screws; wherein the at least two separate auxiliary wedge positioning apparatus each consist essentially of:

(a) a restraint bracket body having a top end flat portion having one hole therethrough and a transverse rail with two bottom integral hooked protrusions each exactly opposite to each other and attached to the transverse rail, said protrusions having an angled gull wing shape with an upward member section and a downward member section, structured to contact the at least one set screw block;

(b) a single triangular slide wedge having a flat side attached to the top rail of the restraint bracket body, with an end flat portion and an angled side facing outward;

(c) a single slide rod passing through the top flat portion hole to contact the end flat portion of the triangular slide wedge; and (d) a single spring disposed around the slide rod, the spring contacting the top end flat portion and exerting pressure against the end flat portion of the triangular slide wedge, this pressure on the slide wedge forcing it against the jet pump assembly.

Figure 5:
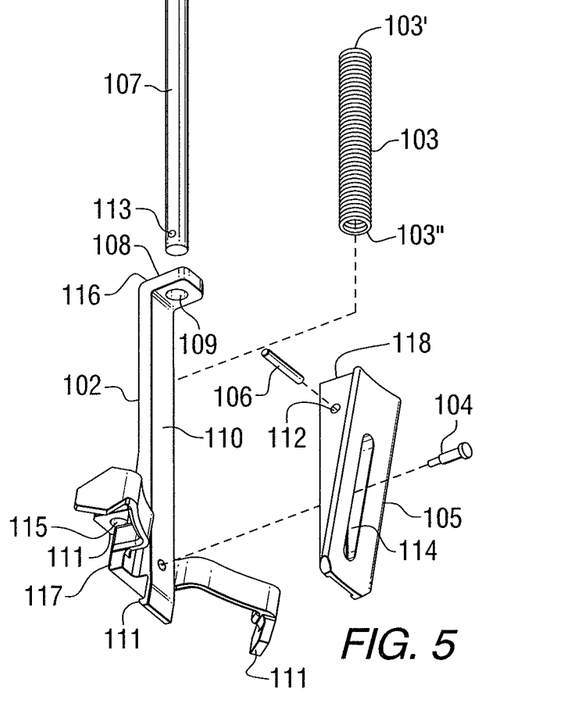
FIG. 5 is an exploded view of the wedge positioning apparatus of FIG. 4 as it may be associated with a restraining bracket.
Figure 6:
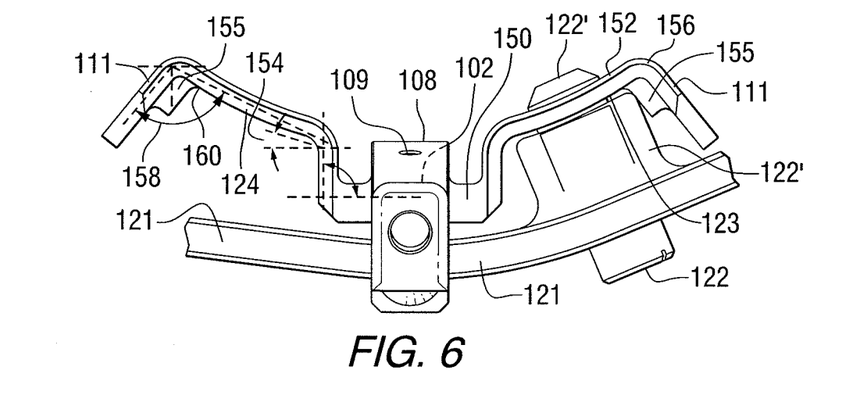
FIG. 6 is a front view of bottom brace hole 115 of the wedge positioning assembly only partially shown in FIG. 4; and also showing "gull wing" hooked protrusions along with positions of an adjustment set screw set in a screw block, and restraining bracket 121.
Figure 7:
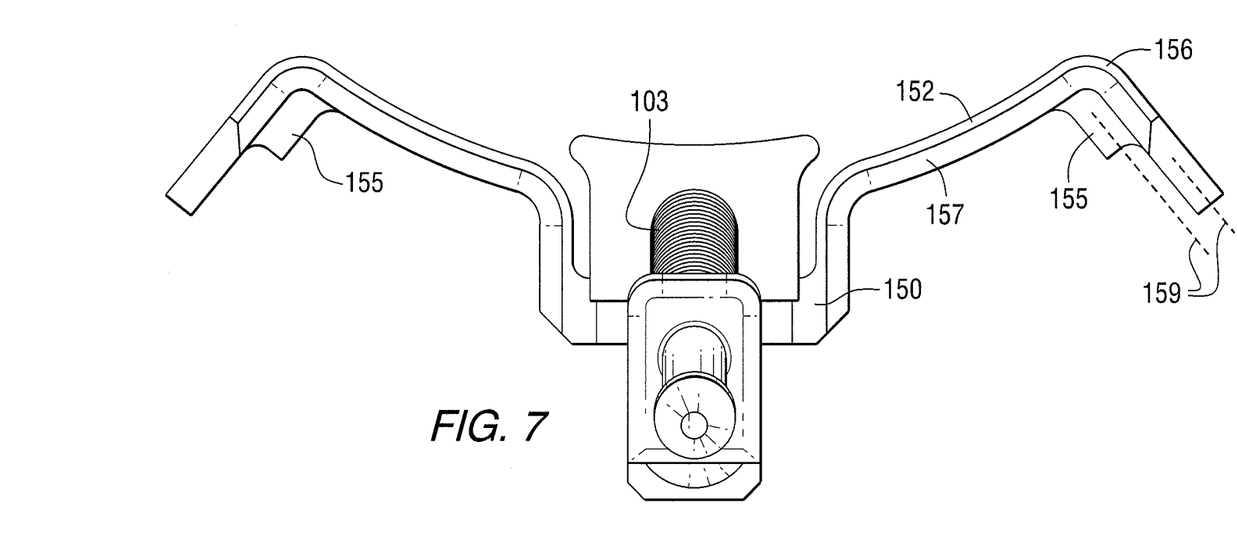
FIG. 7, which best illustrates the invention, is a top view of the wedge positioning apparatus of FIG. 5 illustrating the "gull-wing" shape, and clearly shows the wing stabilizing attachment/contact pad.

Here, the at least one of the adjustment set screw blocks are positioned to contact part of the wing of the bracket body and the at least two separate auxiliary wedge positioning apparatus utilizes a combination of spring force and gravity to provide continuous adjustment against the at least one jet pump assembly. The hooked protrusions, in the form of a "gull wing," provide stability under jet pump assembly vibration and prevent excessive circumferential movement around the jet pump assembly. The term "gull wing" is herein meant to define the configuration shown particularly in FIGS. 6 and 7 as members 150, which is a "parallel" member section, parallel and outward from the rail 110 and transverse at its bottom of the rail 110 and attached to the transverse rail 110 as shown in FIGS. 5-7; 152, which is an angled upward member; and 156, which is an angled downward member attached to 152; all of hooked protrusions 111.

To reiterate, the auxiliary wedge of this invention uses a wedge action to restore the contact support between the jet pump restrainer bracket and the jet pump mixer (see FIG. 2). The wedge uses a combination of spring force and gravity to provide continuous adjustments for possible alignment variations of the mixer and compensations for possible settlement after installation. The lines of contact between the wedge assembly, the inlet mixer and the restrainer bracket form a triangle that adds stability when installed (see FIG. 4). Hooked protrusions, such as member 152, and wing stabilizing attachment/contact pad 155, contact or are adjacent to the set screw block 122' (see FIG. 6) to prevent excessive circumferential movement around the mixer. These protrusions also aid in installation of the apparatus while the mixer is in place and help maintain vertical orientation under vibration conditions. The wing stabilizing attachment is parallel to the upward member and the downward member (best shown in FIG. 6) and adjacent to the at least one set screw block; and assists in preventing circumferential auxiliary wedge movement. Thus, positioning of the stabilizing attachment in such a manner is very important to this invention. The triangle contact design allows for wedge stability while not requiring machining or measurements as do other designs. The maximized stroke enables a minimum number of apparatus to accommodate the range of gap distances for the variations in existing plants.

BRIEF DESCRIPTION OF THE DRAWINGS

The invention as set forth in the claims will become more apparent from the following detailed description and the accompanying drawings that show, by way of example only, a BWR jet pump assembly and a wedge positioning apparatus in accordance with a preferred practice of the present invention, wherein:

DESCRIPTION OF THE PREFERRED EMBODIMENTS

The present invention generally relates to an auxiliary wedge spring apparatus structured to impart a wedge action to fill the space between the jet pump restrainer bracket and the mixing section of the jet pump assembly.

Figure 4:
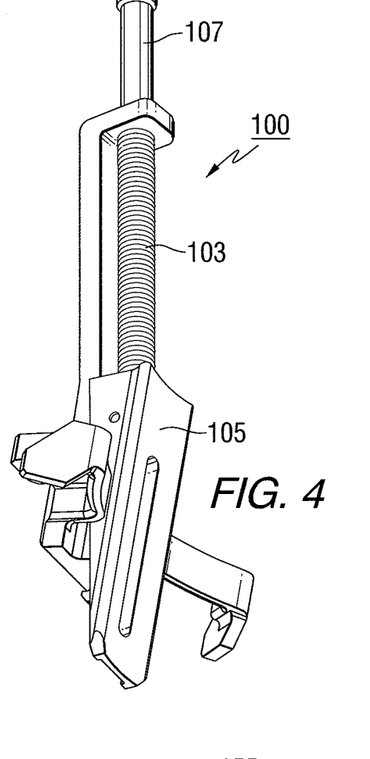
FIG. 4 is a three-dimensional assembled view of the wedge auxiliary positioning apparatus of this invention, shown positioned to be inserted as an auxiliary stabilizing wedge against a jet pump assembly.

Referring now to the drawings, FIGS. 4 and 5 are perspective and exploded views of an auxiliary wedge positioning apparatus 100 according to the main embodiment of the present invention. The auxiliary wedge positioning apparatus 100 includes a restraint bracket body 102, single spring 103, capture rod 104, slide wedge 105, pin 106, and single slide rod 107. As best seen in FIG. 5, the restraint bracket body 102 generally includes a rail 110 transverse to top end flat (spring stop) portion 108 angled at substantially 90° from rail 110 at a first end 116. The auxiliary hooked protrusions 111 having a "gull wing" shape, defined previously, (best shown in FIGS. 5, 6 and 7) at a second end opposite first end 116. Thus, the top of the bracket body 102 is an L shape rather than a U shape. As can be seen best in FIGS. 4 and 5, the hooked protrusions forming the gull-wing are each exactly opposite each other and attached to the transverse rail 110 as part of parallel member section 150.

The hooked protrusions 111, shown in FIG. 6, pass to a parallel member section 150 next to the transverse rail and outward 90° from the rail 110 and the restraint bracket body 102; having an attached middle upward member section 152 at an angle 154 about 20° to 60° to the restraint bracket body 102; ending at an end downward member section 156 at an angle 158 about 70° to 110° from the upward member section 152. The figure itself, FIG. 6, should control as to these angles. Also shown in FIGS. 6 and 7 is a wing stabilizing attachment 155 connected to the bottom of upward member section 152 and downward section 156, partly to ensure stability of the gull-wing to vibration, but also to be disposed adjacent to set screw block 122' which after time may make contact with wing stabilizing attachment 155, which increases wing rigidity and acts to assist or prevent excessive circumferential movement of the entire auxiliary wedge positioning apparatus. The stabilizing attachment 155 is parallel to the upward member section 152 and the downward member section 156, as shown by parallel lines 159 shown in FIG. 7. A chamfer of sections 152 and 156 is also shown in FIG. 7 at 157.

Referring back to FIG. 5, the top end flat spring stop portion 108 includes a bore 109 therethrough to accommodate slide rod 107. A first end of slide rod 107 is inserted through the bore 109. Spring 103 is then inserted over and around/surrounding the slide rod 107, such that a first end 103' of spring 103 contacts one side of top end flat stop portion 108 and the second end of spring end 103" provides pressure against the slide wedge 105.

Figure 8:
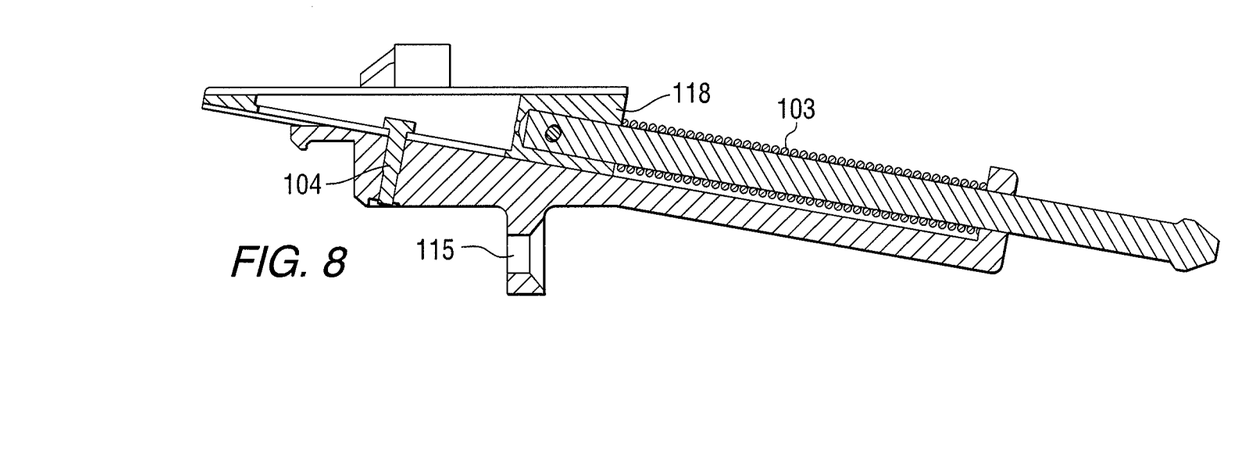
FIG. 8 is a cross-sectional view of the wedge positioning apparatus with capture rod 104 in place.

The single spring 103 is essential to the invention to exert variable pressure against the top wedge end 118. Auxiliary slide wedge 105 is slipped onto rail 110 of restraint bracket body 102, brought into contact with the second end 103" of the spring, and receives the first end of slide rod 107 therein. Wedge pin 106 is inserted through a hole 112 in the first side of slide wedge 105, through a bore 113 within the first end of slide rod 107, and through a hole (not shown) on the second side of slide wedge 105, where it is secured to ground the second end 103" of spring in tension engagement with the flat top wedge end 118 of wedge 105. FIGS. 7 and 8 are additional views of the wedge positioning apparatus with the same numbering as FIGS. 4 to 6 for the sake of simplicity. Also, in FIG. 6 is restraining bracket 121 through which set screw 122 passes into set screw block 122' which is disposed below upward member section 152 of hooked gull wing protrusion 111, as shown, with contact points at 123 and 124 gull wing points. Machined hole 115 transverse to rail 110 is shown above the top of restraining bracket 121. This machined hole 115 is also shown in FIG. 5 and FIG. 8.

Wedge pin 106 is structured to couple slide rod 107 with slide wedge 105. Slide wedge 105 is then pushed towards flat end top stop 108 so as to slightly compress spring 103. Capture rod 104 is then inserted through a slot 114 in the top of slide wedge 105. Capture rod 104 is then coupled to the second end of the restraint bracket body 102. The slot 114 and capture rod 104 cooperate to allow slide wedge 105 to travel along the length of the restraint bracket body 102.

Thus, in summary, the wedge positioning apparatus contains a restraint bracket body 102 having a rail 110 having at its bottom end two integral hooked protrusions/wings 111, the restraint bracket body having an angled top end spring stop 108 having bore 109 therethrough receiving a slide rod 107 having a hole 113 therethrough for receiving a wedge pin 106, which slide rod holds a spring 103 in place. The spring 103 contacts the flat top wedge end 118 of a slide wedge 105 forcing the slide wedge to be held in place, where the slide wedge contacts the rail 110.

Figure 9:
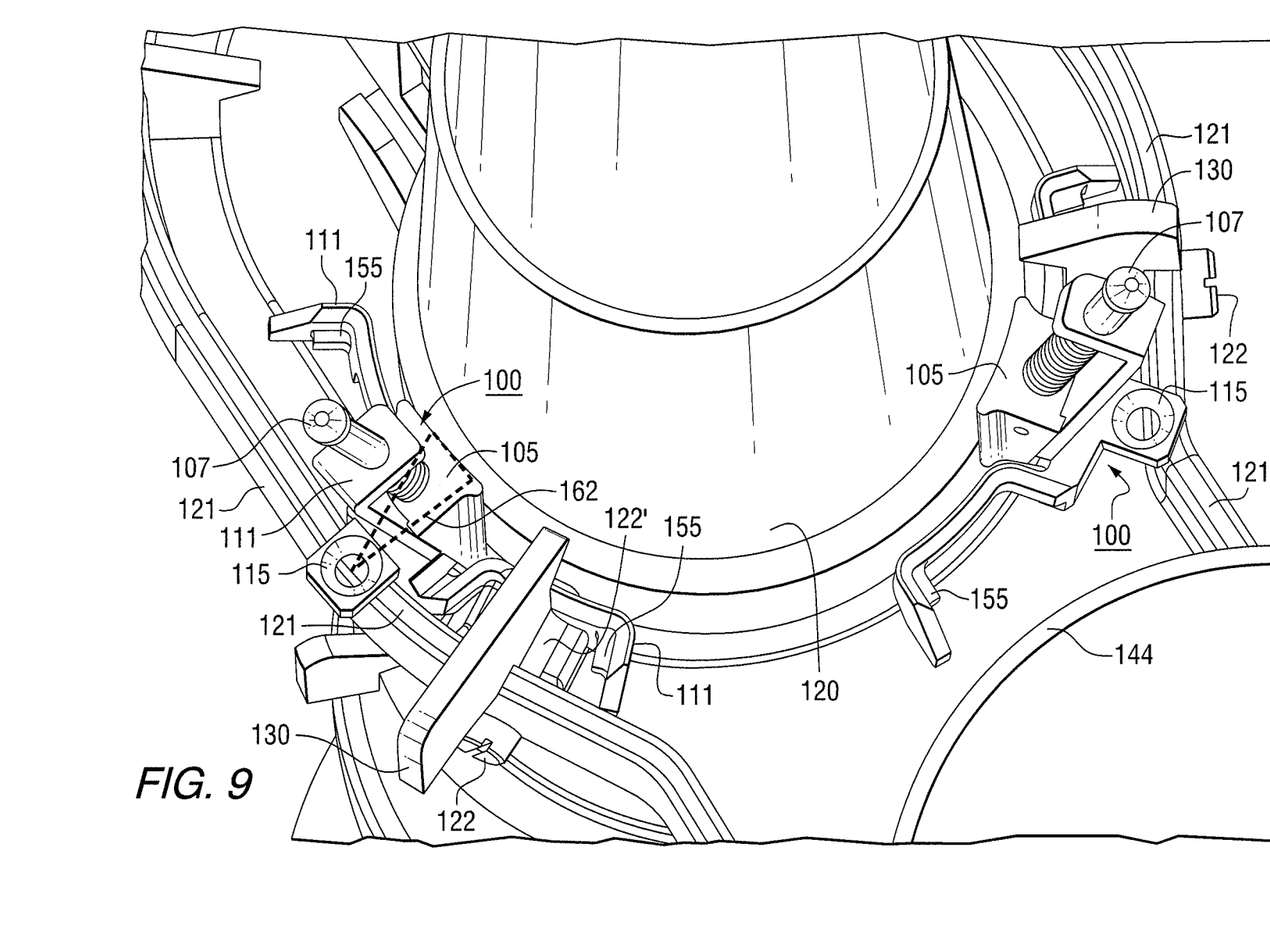
FIG. 9 is a cut-away, three-dimensional view of one embodiment of a stabilized jet pump assembly and riser piping, with two installed auxiliary wedge positioning apparatus disposed about 120° away and opposite the main wedge.
Figure 10:
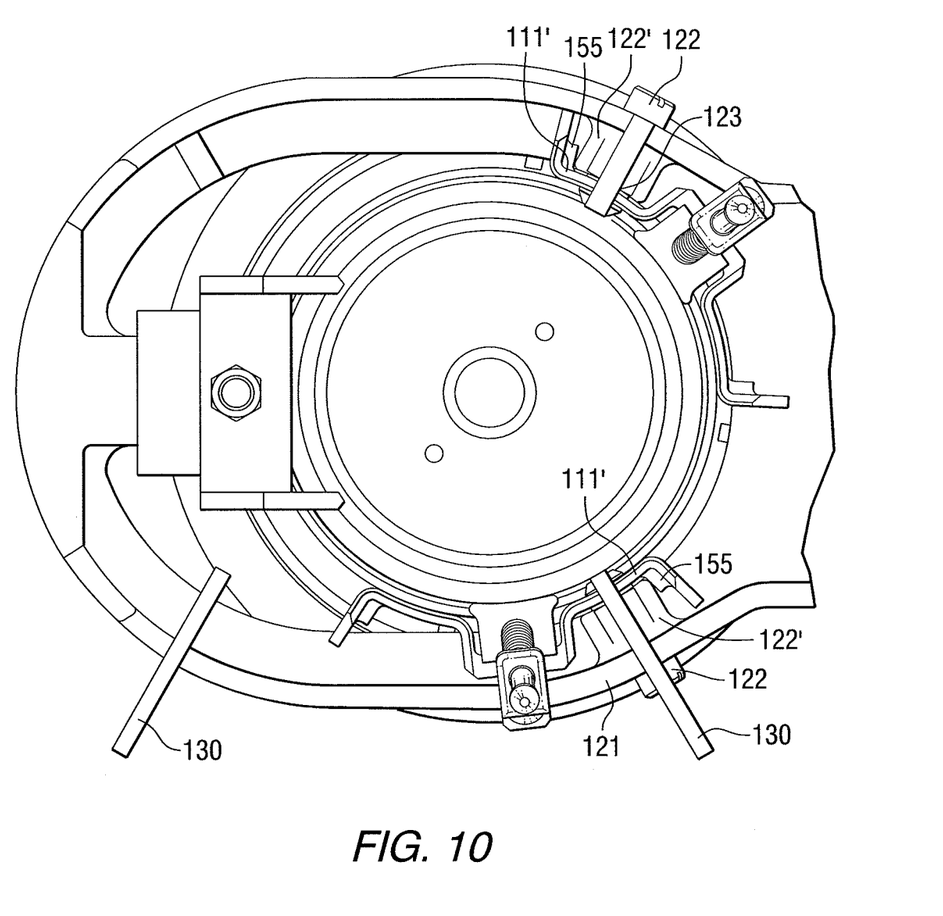
FIG. 10 is an additional cut-away three-dimensional top view of a second embodiment of a stabilized jet pump assembly and riser piping, with two auxiliary wedges positioning apparatus disposed about 120° away and opposite the main wedge.

Now referring to FIG. 9, the auxiliary wedge positioning apparatus 100 uses a combination of spring force and gravity to provide continuous adjustment for possible alignment variations of the components involved (e.g., jet pump assembly 120, restraining bracket 121, set screw 122, set screw block 122', etc.) settle after installation. The apparatus can use a triangular, three-line contact 162 shown in dotted lines to maintain stability between all of the parts. The apparatus has hooked protrusions/wings 111 structured to contact either on the top of or at the bottom of the at least one restrainer bracket set screw block 122', while bottom machining hole 115, while not entirely shown here, is generally above the restraining bracket 121. At least one of these protrusions 111 contact in one embodiment, the set screw block 122' as shown in FIG. 10 where the set screw block 122' is disposed below protrusions 111. Also shown is secondary bracing means 130 which has no part in this invention. The adjustment set screw 122, within set screw block 122', prevents excessive circumferential movement around the jet pump assembly 120. The adjustment set screw blocks 122' are positioned to contact at least one of the protrusions 111 as shown on their underside gull wing point 160 (in FIG. 6).

These protrusions 111 and 111' also aid in installation of the apparatus while the jet pump assembly 120 is in place and provide stability under vibration conditions. In one embodiment, the triangular contact design 162 allows for wedge stability while not requiring machining or take measurements on site. In one embodiment, the spring 103 is selected such that the wedge assembly positioning apparatus 100 is capable of accommodating the large range of gap distances encountered due to variations in existing nuclear plants. Also shown is riser piping 144 and hollow space between the jet pump assembly 120 and bracket 121.

Figure 11:
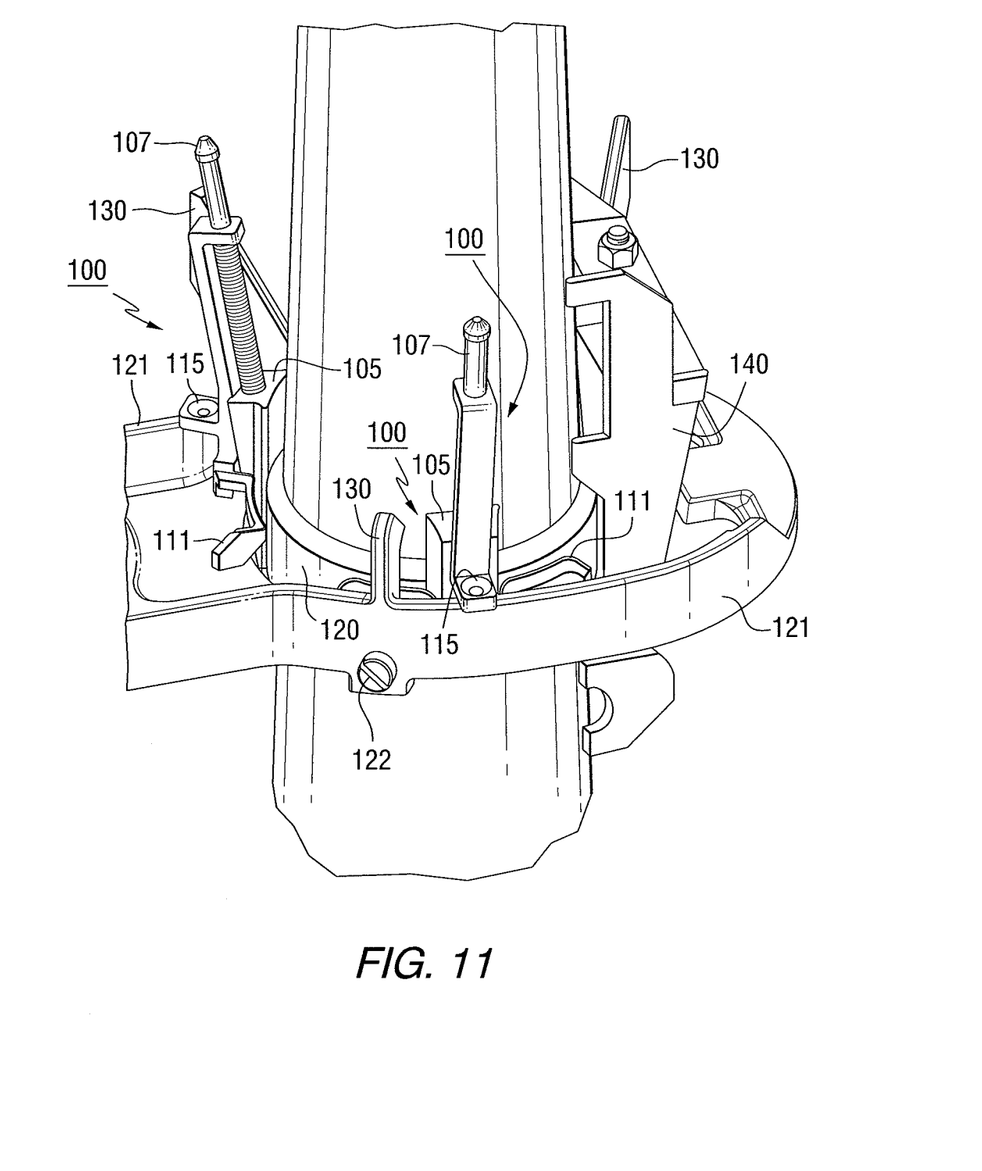
FIG. 11 is a side view of FIG. 10 and providing another view of FIG. 9.

FIG. 11 is a side view of FIG. 10, using the same numbering for simplicity, but set screw blocks cannot be seen. The main wedge means, generally shown as 140, is shown disposed from 110° to 130° usually 120° angle from both auxiliary wedges 100.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An auxiliary wedge positioning apparatus for use in a nuclear reactor having at least one jet pump assembly, the wedge positioning apparatus consisting essentially of:

(a) a restraint bracket body having a top end flat portion having one hole therethrough and a transverse rail with two bottom integral hooked protrusions each exactly opposite to each other and attached to the transverse rail, said protrusions having an angled gull wing shape with an upward member section and a downward member section;
(b) a single triangular slide wedge having a flat side attached to the transverse rail of the restraint bracket body, with an end flat portion and an angled side facing outward;
(c) a single slide rod passing through the top flat portion hole to contact the end flat portion of the triangular slide wedge; and
(d) a single spring disposed around the slide rod, the spring contacting both the top end flat portion and exerting pressure against the end flat portion of the triangular slide wedge to exert pressure against adjacent bodies in the nuclear reactor; wherein the hooked protrusions contain a parallel member section, a middle upward member section and an end downward member section next to the transverse rail, providing an angled gull wing shape, where the parallel member section is outward at a 90° angle from the restraint bracket body, the middle upward member section is at a 20° to 60° angle to the restraint bracket body and the downward member section is at an angle of 70° to 110° from the upward member section and wherein the parallel member section has an attached upward member section ending and a downward member section; wherein the wedge positioning apparatus utilizes a combination of spring force and gravity to continuously tighten over time.

2. The wedge positioning apparatus of claim 1, wherein the hooked protrusions contain a wing angle stabilizing attachment connected to the upward member section and downward member section, where the wing stabilizing attachment is parallel to the upward member section and the downward member section.

3. The wedge positioning apparatus of claim 2, wherein the parallel member section is outward from and attached to the transverse rail, the downward member section is attached to the upward member section which upward section is in turn attached to the parallel member section.

4. The wedge positioning apparatus of claim 1 used for positioning in close contact with a circular jet pump assembly where the gull wing design conforms to the jet pump assembly using a three-line contact to maintain stability between all of the parts, where the hooked protrusions aid in installation of the apparatus while the jet pump assembly is in place and provide stability under vibration conditions, wherein the at least one gull wing is positioned partially around and in contact with the jet pump assembly.

5. In a nuclear reactor, at least two separate auxiliary wedge positioning apparatus, where the nuclear reactor, contains riser piping that can feed pumped cooled water to at least one jet pump assembly having a circumferential restrainer bracket, which restrainer bracket has at least two vibration damping adjustment set screws, each set in a set screw block contacting the jet pump assembly, the bracket positioned around the jet pump assembly which bracket also contacts the riser piping, such assembly and riser piping subject to vibration during reactor operation, wherein a main wedge is utilized away from the set screws, while the at least two separate auxiliary wedge positioning apparatus being positioned adjacent the set screws; wherein the at least two separate auxiliary wedge positioning apparatus consists essentially of:

(a) a restraint bracket body having a top end flat portion having one hole therethrough and a transverse rail with two bottom integral hooked protrusions each exactly opposite to each other and attached to the transverse rail, said protrusions having an angled gull wing shape with an upward member section and a downward member section, structured to contact the at least one set screw block;
(b) a single triangular slide wedge having a flat side attached to the top rail of the restraint bracket body, with an end flat portion and an angled side facing outward;
(c) a single slide rod passing through the top flat portion hole to contact the end flat portion of the triangular slide wedge; and
(d) a single spring disposed around the slide rod, the spring contacting the top end flat portion and exerting pressure against the end flat portion of the triangular slide wedge this pressure on the slide wedge forcing it against the jet pump assembly; wherein the hooked protrusions contain a parallel member section, a middle upward member section and an end downward member section next to the transverse rail, providing an angled gull wing shape, where the parallel member section is outward at a 90° angle from the restraint bracket body, the middle upward member section is at a 20° to 60° angle to the restraint bracket body and the downward member section is at an angle of 70° to 110° from the upward member section.

6. The wedge positioning apparatus of claim 5 in use in a nuclear reactor of claim 5, wherein both adjustment set screw blocks contact the hooked protrusion to stabilize it.

7. The wedge positioning apparatus of claim 5 in use in a nuclear reactor of claim 5, wherein the wedge positioning apparatus utilizes a combination of spring force and gravity to continually tighten over time the wedge disposed next to the at least one jet pump assembly.

8. The wedge positioning apparatus of claim 5, wherein the hooked protrusions contain a parallel member section, an upward member section and an end downward member section next to the transverse rail and a wing stabilizing attachment connected to upward member section and downward member section, where the wing stabilizing attachment is parallel to the upward member section and the downward member section and is adjacent to the at least one set screw block, and assists in preventing excessive circumferential movement of the auxiliary wedge positioning apparatus.

9. The wedge positioning apparatus of claim 8, wherein the parallel member section is outward from and attached to the transverse rail, an end downward member section is attached to a middle upward member section which upward section is in turn attached to the parallel member section next to the transverse rail.

10. The wedge pump positioning apparatus of claim 5 used for positioning in close contact with a circular jet pump assembly where the gull wing design conforms to the jet pump assembly using a three-line contact to maintain stability between all of the parts, where the hooked protrusions aid in installation of the apparatus while the jet pump assembly is in place and provide stability under vibration conditions, wherein the at least one gull wing is positioned partially around and in contact with the jet pump assembly and wherein parallel member section a has an attached upward member section ending and a downward member section; wherein the wedge positioning apparatus utilizes a combination of spring force and gravity to continuously tighten over time.

* * * * *